United States Patent [19]

Bolderoff

[11] 4,352,625
[45] Oct. 5, 1982

[54] CONTAINER HANDLING APPARATUS

[76] Inventor: Jack Bolderoff, 18 Hooke Rd., Elizabeth West, Australia, 5112

[21] Appl. No.: 142,761

[22] Filed: Apr. 22, 1980

[30] Foreign Application Priority Data

Apr. 23, 1979 [AU] Australia ............................ PD85006

[51] Int. Cl.$^3$ .............................................. B60P 1/00
[52] U.S. Cl. .................................. 414/494; 294/81 R
[58] Field of Search ...................... 414/500, 559, 494; 294/81 R, 67 B, 67 C

[56] References Cited

U.S. PATENT DOCUMENTS 3,125,800  3/1964  Klima ........................... 294/81 R X
3,841,505  10/1974  Kent ................................. 414/500 X
3,899,205  8/1975  Lanigan et al. .................... 294/81 R
3,964,626  6/1976  Arrequi ............................... 414/500
4,147,266  4/1979  Corompt ....................... 294/81 R X

FOREIGN PATENT DOCUMENTS 2302199  8/1973  Fed. Rep. of Germany ...... 414/500

Primary Examiner—John J. Love
Assistant Examiner—L. E. Williams
Attorney, Agent, or Firm—Kinzer, Plyer, Dorn & McEachran

[57] ABSTRACT

A system for handling sea containers on a road transport vehicle, the road transport vehicle having a tilting frame to carry the sea container. A brass beam is locked to the sea container and a winch hauls the container up the tilted frame from the ground. Reverse operation lowers the container onto the ground.

4 Claims, 4 Drawing Figures

CONTAINER HANDLING APPARATUS

This invention relates to the handling of containers, more particularly large sea containers adapted to be transported on container ships.

BACKGROUND OF THE INVENTION

In the handling of sea containers various forms of cranes and the like have been utilized for lifting the containers and placing them in the desired position, either of flat top railway cars, road transport vehicles or the like.

At the final destination of the container, such as factory ware house or the like facilities are often not available for lifting these containers and removing them from the road transport vehicles.

To this end road transport vehicles can be provided with a tilting frame comprising rails or the like which are titled and in which there some means for drawing the container onto the tilted or sloping rails, and the rails are then lowered to the horizontal position. For removal the rails are tilted and the container is then slid off the rails for example while the road vehicle moves forwardly.

It is an object of this invention to provide means on the vehicle which facilitates the drawing of the container onto the rails and also the removal of the container. Also with this invention the container can be stored in position on one end if so desired.

SUMMARY OF THE INVENTION

According to this invention there is provided a system for handling sea containers, said system including a road transport vehicle, a tiltable support frame on the vehicle adapted to support a sea container, said support frame in its tilted position having one of its ends adjacent the surface on which the vehicle rests, and means for moving the container along said support frame, characterized by a cross member movable along said support frame and having means to lock onto the sea container, said means for moving the container being attached to said cross member whereby said container is drawn along said support frame by said cross member.

DESCRIPTION OF THE PREFERRED EMBODIMENT

Figure 1:
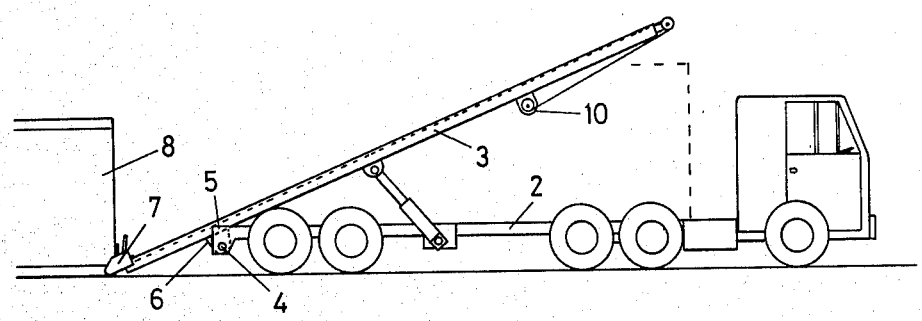
FIG. 1 shows a vehicle fitted with a cross beam according to the invention.
Figure 2:
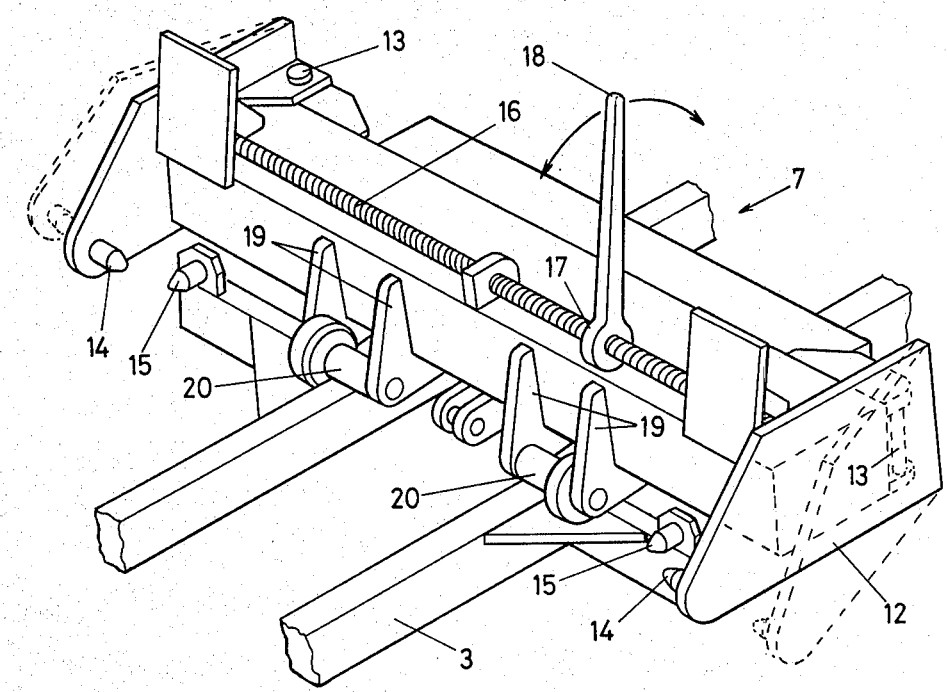
FIG. 2 is a perspective view of the cross beam.

As shown in FIG. 1, a motor vehicle 1 having chassis members 2 has pivoted thereto a pair of rails 3 which are adapted in the horizontal position to lie between the chassis members 2. The rails 3 are pivoted to chassis members 2 by pivot pins 4 which are mounted in brackets 5 attached to the chassis members 2 at a distance below the level of the chassis members 2. Further brackets 6 on the rails also engage the pins 4, the arrangement being such that on tilting the rails not only tilt, but also move rearwardly and downwardly to bring the rail ends closer to the ground at a lesser angle of tilt. The rails 3 can be tilted by rams 11.

The invention includes a cross beam 7 which is adapted to be locked to the container 8, the beam having a bracket 9 adapted to be attached to a chain or cable of a winch 10, whereby the beam 7 can be drawn with the container attached up the rails.

The beam 7 extends across the width of the container and is provided at each end with a locking assembly comprising a locking plate 12 pivoted by a pin 13 to the beam 7, the plates 12 carrying a locking pin 14 which engages in respective holes in the sides of the base of the container. Container stop and locating pins 15 are provided to engage in respective holes in the ends of the base of the container 8.

The locking plates 12 are provided about the pivot pin 13 by rods 16 which are pivotally attached by brackets to the plates 12, the rods being adapted to be moved longitudinally by a screw mechanism 17 operated by a ratchet handle 18. The screw mechanism has opposite hand threads at each end so that operation in one direction will move both rods apart, while movement in the opposite direction will move the rods towards each other.

It will be realised that other forms of mechanism for moving the locking plates can be provided, such as a single ram actuating the rods 16, or alternatively a small hydraulic ram can be attached to each locking plate.

Figure 3:
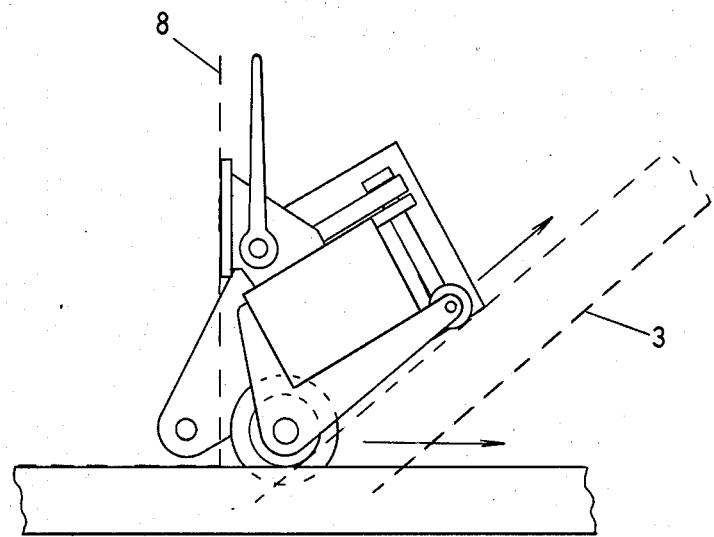
FIG. 3 is a side elevation of the cross beam.

The beam 7 is provided with pairs of brackets 19 carrying rollers 20 so that the beam runs on the rails 3. As shown in FIG. 3, the beam 7 can be lowered down the tilted rails to be locked onto a container resting on the ground. The winch then pulls the container up the rails with the vehicle rolling backwardly while the container is drawn onto the rails. When the container rests on the rails, the rails can be lowered to the horizontal position and the container moved fully forward either before or after the rails are lowered to their horizontal position.

The container can be removed by raising the rails to the tilt position, and then by controlling the winch and moving the vehicle forwardly the container can be placed on the ground.

Figure 4:
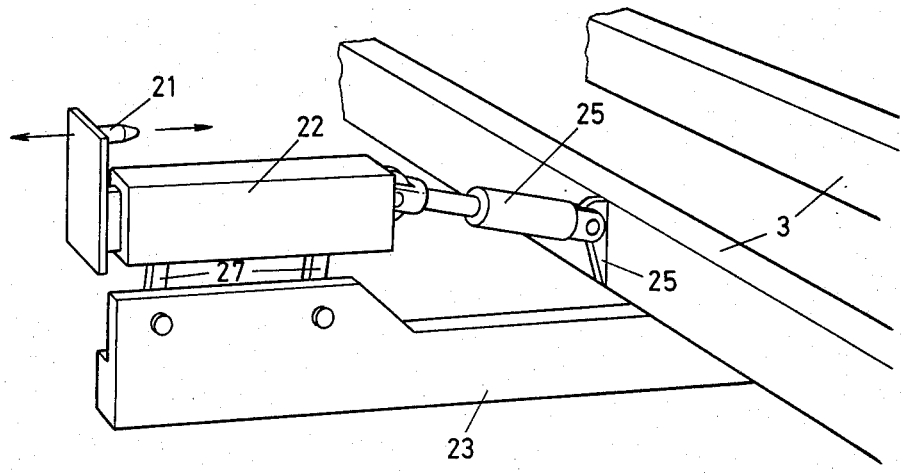
FIG. 4 is a view of the container locking device at the rear of the container.

As shown in FIG. 4, means are provided to lock and secure the container in position. This includes a pair of rear locking pins 21 (only one being shown) mounted on a movable carriage member 22 mounted on cross struts 23 by legs 24. The member 22 is controlled by hydraulic ram 25 attached by a bracket 26 on the rail 3. When the container is loaded on the rails, the rear locking pins engage in the holes in the sides of the base of the container, and thus locked and locate the rear of the container.

Thus it will be seen that according to the invention no ancilliary equipment is required for the loading and unloading of a sea container from a road transport vehicle. As noted above it is merely necessary to tip the rails to the tilt position, operate the winch to lower the container so that its lower end rests on the ground, and then while moving the vehicle forwardly and controlling the winch the container can be placed on the ground.

It will be realized also that the system of the invention can be utilized to stack the containers on an end to reduce the storage problems of these large containers, and in this case the rails could be such that they can be tilted to the vertical position and then the cross beam removed from the container and the truck then moved away from the container.

It will be realized also that instead of a winch controlling the movement of the container on the rails, that this movement can be controlled by one or more hydraulic rams particularly if the rams act on a cable and the like through pulleys whereby the movement of the ram is amplified to move the container.

I claim:

1. In a system for handling sea containers to secure such a container in a loaded position on a vehicle, a tiltable support frame on the vehicle adapted to support a sea container having a forward and rearward end, said support frame in its tilted position having one of its ends adjacent the surface on which the vehicle rests, and means for moving the container along said support frame, the improvement characterized by a cross member movable along said support frame and having means to lock onto the sea container, said means for moving the container being attached to said cross member whereby said container may be drawn along said support frame by and during movement of said cross member, said cross member including stop and locating pins fixedly mounted thereon to engage openings in the forward end of the base of the container and also including a set of forward locking pins on locking plates pivotally mounted on the cross member to be engageable with apertures at the sides of the base of the container at the forward portion thereof, actuating means being provided to pivot the plates toward and away from each other to engage the second-named pins in said apertures in the sides of the base of the container, and a set of rearward locking pins engageable with apertures at the rear of the container base to secure the container in the loaded position, each pin in the rearward set being supported by a movable carriage, and means for moving the carriages toward and away from the container to engage and disengage the pins.

2. A system for handling sea containers as defined in claim 1 characterized in that said support frame comprises a pair of spaced rails, said cross member having rollers to roll along said rails.

3. A system for handling sea containers as defined in claim 2 characterized in that said rails are pivoted to the rear of the chassis of the vehicle, said chassis and rails each having depending flanges pivoted to each other by pivot pins so that the pivot point is below said chassis whereby on tilting of said rails the rails move rearwardly and downwardly during the tilting movement.

4. A system for handling sea containers as defined in claim 3 further characterized further in that said means for moving the container comprises a winch mounted on the support frame at its forward end, the end of the cable of said winch being attached to said cross member.

* * * * *